US009896552B2

(12) United States Patent
Nomura et al.

(10) Patent No.: US 9,896,552 B2
(45) Date of Patent: Feb. 20, 2018

(54) METHOD FOR PRODUCING RUBBER WET MASTER BATCH

(71) Applicant: Toyo Tire & Rubber Co., Ltd., Osaka-shi, Osaka (JP)

(72) Inventors: Kenji Nomura, Osaka (JP); Makoto Tanaka, Osaka (JP); Norio Minouchi, Osaka (JP)

(73) Assignee: TOYO TIRE & RUBBER CO., LTD., Osaka (JP)

( * ) Notice: Subject to any disclaimer, the term of this patent is extended or adjusted under 35 U.S.C. 154(b) by 51 days.

(21) Appl. No.: 14/912,255

(22) PCT Filed: Mar. 14, 2014

(86) PCT No.: PCT/JP2014/056944
§ 371 (c)(1),
(2) Date: Feb. 16, 2016

(87) PCT Pub. No.: WO2015/037261
PCT Pub. Date: Mar. 19, 2015

(65) Prior Publication Data
US 2016/0208058 A1    Jul. 21, 2016

(30) Foreign Application Priority Data
Sep. 10, 2013  (JP) .................... 2013-187396

(51) Int. Cl.
| C08J 3/20 | (2006.01) |
| C08J 3/22 | (2006.01) |
| B60C 15/06 | (2006.01) |
| B60C 1/00 | (2006.01) |
| C08K 3/04 | (2006.01) |
| C08L 21/00 | (2006.01) |
| C08J 3/215 | (2006.01) |

(52) U.S. Cl.
CPC .......... *C08J 3/22* (2013.01); *B60C 1/00* (2013.01); *B60C 15/06* (2013.01); *C08J 3/215* (2013.01); *C08K 3/04* (2013.01); *C08L 21/00* (2013.01); *C08J 2307/02* (2013.01); *C08J 2321/02* (2013.01); *C08K 2201/006* (2013.01)

(58) Field of Classification Search
CPC .... C08J 3/226; C08J 3/22; C08K 3/04; C08K 2201/006; C08L 7/00; B60C 1/0041
See application file for complete search history.

(56) References Cited

U.S. PATENT DOCUMENTS

| 5,780,537 | A | 7/1998 | Smith et al. | |
| 6,077,899 | A * | 6/2000 | Yatsuyanagi | C08L 15/00 524/495 |
| 7,640,957 | B2 | 1/2010 | Sandstrom | |
| 8,053,496 | B1 * | 11/2011 | Minouchi | C08J 3/226 523/351 |
| 8,110,620 | B1 * | 2/2012 | Minouchi | C08J 3/226 523/351 |
| 8,258,207 | B2 | 9/2012 | Gaudet | |
| 9,139,705 | B2 * | 9/2015 | Kimura | C08L 91/00 |
| 9,290,634 | B2 * | 3/2016 | Miyasaka | C08C 1/14 |
| 9,353,239 | B2 * | 5/2016 | Miyasaka | B60C 1/00 |
| 9,527,968 | B2 * | 12/2016 | Nomura | B29B 13/06 |
| 2003/0144406 | A1 | 7/2003 | Gorl et al. | |
| 2015/0011677 | A1 | 1/2015 | Kimura | |
| 2015/0240060 | A1 * | 8/2015 | Wada | C08L 9/00 524/496 |
| 2016/0289398 | A1 * | 10/2016 | Tanaka | B60C 15/06 |
| 2017/0137582 | A1 * | 5/2017 | Nomura | C08J 3/226 |

FOREIGN PATENT DOCUMENTS

| JP | 59-27932 A | 2/1984 |
| JP | 59-49247 A | 3/1984 |
| JP | 10-95856 A | 4/1998 |
| JP | 2002-256109 A | 9/2002 |
| JP | 2003-26816 A | 1/2003 |
| JP | 2007-197622 A | 8/2007 |
| JP | 2009-96981 A | 5/2009 |
| JP | 2012-111888 A | 6/2012 |
| JP | 2012-158666 A | 8/2012 |
| JP | 2012-197375 A | 10/2012 |
| JP | 2013-199543 A | 10/2013 |
| WO | 2011/145586 A1 | 11/2011 |

OTHER PUBLICATIONS

International Search Report dated Jun. 17, 2014, issued in counterpart Application No. PCT/JP2014/056944 (2 pages).
Notification of Transmittal of Translation of the International Preliminary Report on Patentability (Form PCT/IB/338) of International Patent Application No. PCT/JP2014/056944, dated Mar. 24, 2016 with Forms PCT/IB373 and PCT/ISA/237. (5 pages).
International Search Report dated Jul. 22, 2014, issued in International Application No. PCT/JP2014/062623, counterpart to U.S. Appl. No. 15/035,346.

(Continued)

*Primary Examiner* — Hannah Pak
(74) *Attorney, Agent, or Firm* — Westerman, Hattori, Daniels & Adrian, LLP

(57) ABSTRACT

In the step (I), the period (minute(s)) for dispersing the carbon black species A showing a nitrogen adsorption specific surface area ($N_2SA$-(A)value) of 130 $m^2/g$ or less in the dispersing solvent and that minute(s)) for dispersing the carbon black species B showing an $N_2SA$-(B) value lower than the $N_2SA$-(A) value by 25 $m^2/g$ or more in the dispersing solvent by $\alpha(A)$ and $\alpha(B)$, respectively, and further representing the rotation number (rpm) of a rotor of a dispersing machine used in the dispersing when the carbon black species A is dispersed, and that (rpm) of a rotor of a dispersing machine used in the dispersing when the carbon black species B is dispersed by $\beta(A)$ and $\beta(B)$, respectively, the following expression is satisfied:

$$1.1\alpha(B) \times \beta(B) \leq \alpha(A) \times \beta(A) \leq 1.5\alpha(B) \times \beta(B) \qquad (1).$$

6 Claims, No Drawings

(56) References Cited

OTHER PUBLICATIONS

Notification of Transmittal of Translation of the International Preliminary Report on Patentability (Form PCT/IB/338) issued in International Application No. PCT/JP2014/062623 dated May 26, 2016 with Forms PCT/IB/373 and PCT/ISA/237,counterpart to U.S. Appl. No. 15/035,346.
Carbon Black Handbook, Third Edition, Carbon Black Association, Apr. 15, 1995, p. 266.
Office Action dated Apr. 26, 2017, issued in counterpart Japanese Application No. 2013-187396, with English translation. (7 pages).
Non-Final Office Action dated Sep. 22, 2017, issued in U.S. Appl. No. 15/035,346.

* cited by examiner

METHOD FOR PRODUCING RUBBER WET MASTER BATCH

TECHNICAL FIELD

The present invention relates to a rubber wet master batch obtained by using at least a filler, a dispersing solvent and a rubber latex solution as raw materials; a method for producing the rubber wet master batch; a rubber composition including the rubber wet master batch; and a pneumatic tire obtained by use of the rubber composition.

BACKGROUND ART

Hitherto, it has been known in the rubber industry that when a rubber composition containing a filler, such as carbon black, is produced, a rubber wet master batch is used to improve the workability of the composition, and the dispersibility of the filler in the composition. This rubber wet master batch is a substance obtained by mixing the filler and a dispersing solvent beforehand with each other at a predetermined ratio, dispersing the filler into the dispersing solvent by mechanical force, mixing the resultant filler-containing slurry solution with a rubber latex solution in the phase of the liquids, adding, after the mixing, a solidifier such as an acid thereto to solidify the mixture, and then collecting and drying the mixture. The use of such a rubber wet master batch gives a rubber composition that contains a filler better in dispersibility and is better in rubber physical properties, such as workability and reinforceability, than the use of a rubber dry master batch obtained by mixing a filler with a rubber in a solid phase. The use of such a rubber composition as a raw material makes it possible to produce a pneumatic tire or some other rubber product that is decreased in, for example, rolling resistance, and is excellent in fatigue resistance.

In techniques for producing a rubber wet master batch, a report is made about a technique of using two or more carbon black species together in order to improve the resultant vulcanized rubber in various physical properties.

Patent Document 1 listed below describes a technique of a filler-containing rubber composition in which: a diene rubber is contained in an amount of 10 parts by mass, and a preliminary mixed filler obtained by mixing 80% or more by mass of a hard-class carbon black species preliminarily with 20% or less by mass of a different filler is contained in an amount of 1 to 150 parts by mass; and when the different filler contains a carbon black species, the average particle diameter of primary aggregates of this carbon black species is set to 7/10 or less of that of primary aggregates of the hard-class carbon black species.

PRIOR ART DOCUMENT

Patent Document

Patent Document 1: JP-A-2002-256109

SUMMARY OF THE INVENTION

Problems to be Solved by the Invention

However, the inventors have made eager investigations to find out that the above-mentioned precedent technique has a newly-discovered problem. Specifically, the technique described in Patent Document 1 has an object of improving a vulcanized rubber in both of mechanical properties and viscoelastic properties by using therein two carbon black species different from each other in average particle diameter. However, no contrivance is made in a producing process thereof in order to heighten the dispersibility of the carbon black species.

In light of the above-mentioned actual situation, the present invention has been made. An object thereof is to provide a rubber wet master batch that is a raw material of a vulcanized rubber improved in both of low exothermic performance and fatigue resistance with a good balance; a method for producing the rubber wet master batch; a rubber composition; and a pneumatic tire.

Means for Solving the Problems

In order to solve the above-mentioned problem, the inventors have made eager investigations about the following effect when two or more carbon black species are used: an effect of the dispersibility of the species onto the low exothermic performance and the fatigue resistance of the resultant vulcanized rubber. As a result, the inventors have found out the following phenomena:

(i) The inventors have made investigations about a relationship between the nitrogen adsorption specific surface area ($N_2SA$) of carbon black and the dispersibility thereof, so that a carbon black species high in $N_2SA$ is bad in dispersibility so that a large quantity of energy is required to heighten the dispersibility.

(ii) When two carbon black species different from each other in $N_2SA$ are dispersed under the same conditions, either of a poor dispersion of the carbon black species high in $N_2SA$, or a fracture of the structure of the carbon black species low in $N_2SA$ is generated, so that the reinforcing effect of the carbon black species is decreased.

On the basis of the findings (i) and (ii), the present invention has been achieved. Thus, the present invention is as follows.

Accordingly, the present invention is a method for producing a rubber wet master batch obtained by using at least a filler, a dispersing solvent and a rubber latex solution as raw materials, the method comprising a step (I) of dispersing the filler into the dispersing solvent to produce a filler-containing slurry solution, a step (II) of mixing the filler-containing slurry solution, with the rubber latex solution to produce a filler-containing rubber latex solution, and a step (III) of solidifying and drying the filler-containing rubber latex solution, wherein the filler comprises two filler species that are a carbon black species A showing a nitrogen adsorption specific surface area ($N_2SA$-(A) value) of 130 m$^2$/g or less, and a carbon black species B showing an $N_2SA$-(B) value lower than the $N_2SA$-(A) value by 25 m$^2$/g or more; and in the case of representing, in the step (I), the period (minute(s)) for dispersing the carbon black species A in the dispersing solvent and that (minute(s)) for dispersing the carbon black species B in the dispersing solvent by α(A) and α(B), respectively, and further representing the rotation number (rpm) of a rotor of a dispersing machine used in the dispersing when the carbon black species A is dispersed, and that (rpm) of a rotor of a dispersing machine used in the dispersing when the carbon black species B is dispersed by β(A) and β(B), respectively, the following expression is satisfied:

$$1.1\alpha(B)\times\beta(B) \leq \alpha(A)\times\beta(A) \leq 1.5\alpha(B)\times\beta(B) \qquad (1)$$

In the method according to the present invention for producing a rubber wet master batch, at least the following are used as a filler: two filler species that are a carbon black species A showing a nitrogen adsorption specific surface area ($N_2SA$-(A) value) of 130 $m^2/g$ or less, and a carbon black species B showing a $N_2SA$-(B) value lower than the $N_2SA$-(A) value by 25 $m^2/g$ or more. The carbon black species A contributes mainly to an improvement of the resultant vulcanized rubber in low exothermic performance, and the carbon black species B contributes mainly to the vulcanized rubber in fatigue resistance. The use of these two carbon black species makes it possible that the vulcanized rubber, which is obtained by the rubber wet master batch obtained from the producing method according to the present invention, attains the compatibility of low exothermic performance with fatigue resistance.

However, as described above, when two carbon black species different from each other in $N_2SA$ are dispersed under the same conditions, either of a poor dispersion of the carbon black species high in $N_2SA$, or a fracture of the structure of the carbon black species low in $N_2SA$ is generated, so that the finally obtained vulcanized rubber cannot attain the compatibility of low exothermic performance with fatigue resistance.

In the present invention, in the case of representing, in the step (I), the period (minute(s)) for dispersing the carbon black species A in the dispersing solvent and that minute(s)) for dispersing the carbon black species B in the dispersing solvent by $\alpha(A)$ and $\alpha(B)$, respectively, and further representing the rotation number (rpm) of a rotor of a dispersing machine used in the dispersing when the carbon black species A is dispersed, and that (rpm) of a rotor of a dispersing machine used in the dispersing when the carbon black species B is dispersed by $\beta(A)$ and $\beta(B)$, respectively, the following expression is satisfied: $1.1\alpha(B) \times \beta(B) \leq \alpha(A) \times \beta(A) \leq 1.5\alpha(B) \times \beta(B)$. By giving a larger quantity of energy to the dispersing of the carbon black species A than to that of the carbon black species B, the carbon black species A, which is poor in dispersibility, can be heightened in dispersibility. The energy giving to the dispersing of the carbon black species B, which is good in dispersibility, is restrained into a low level so that the structure of the carbon black species B is kept while the dispersibility of the carbon black species B can be heightened. As a result, while the present invention prevents both of a poor dispersibility of the carbon black species A, which is high in $N_2SA$-(A), and any fracture of the structure of the carbon black species B, which is low in $N_2SA$, the invention makes it possible to heighten these two species in dispersibility to produce a vulcanized rubber attaining a low exothermic performance compatible with fatigue resistance.

In the producing method, it is preferred that in the step (I), the dispersing of the carbon black species A and that of the carbon black species B are performed separately from each other to satisfy the relationship (1), and after the dispersings, the resultants are mixed with each other in advance. The resultants, which are a carbon-black-species-A-containing solution and a carbon-black-species-B-containing solution, are mixed with each other in advance, and subsequently the mixture is mixed with the rubber latex solution to produce a filler-containing rubber latex solution, whereby the finally obtained vulcanized rubber can be further improved in low exothermic performance.

In the producing method, it is preferred that the step (I) is a step (I-(a)) in which when the filler is dispersed into the dispersing solvent, at least one portion of the rubber latex solution is added thereto, thereby producing the filler-containing slurry solution that is a slurry solution in which rubber latex particles are bonded to the filler, and the step (II) is a step II-(a) in which the rubber-latex-particle-bonded-filler-containing slurry solution is mixed with the rest of the rubber latex solution, thereby producing the filler-containing rubber latex solution that is a rubber latex solution in which the rubber latex particles are bonded to the filler.

According to the producing method, at the time of dispersing the filler into the dispersing solvent, at least one portion of the rubber latex solution is added thereto, thereby producing the filler-containing slurry solution, which is a slurry solution in which rubber latex particles are bonded to the filler (step I-(a)). Through this step, a very thin latex phase is produced over a part or the whole of the surface of the filler, so that when the resultant slurry solution is mixed with the rest of the rubber latex solution in the step (II-(a)), the re-aggregation of the filler can be prevented. As a result, the filler is evenly dispersed, so that a rubber wet master batch can be produced in which the filler is excellent in dispersion stability even when time elapses. This rubber wet master batch is a master batch in which the filler is evenly dispersed and further the re-aggregation of the filler is also restrained over time. Consequently, a vulcanised rubber obtained using, as a raw material, a rubber composition containing this master batch is remarkably improved in low exothermic performance and fatigue resistance.

Being different from a case in which merely by dispersing a filler into a dispersing solvent, a slurry solution is produced, the present producing method makes the dispersibility of the filler in the slurry solution excellent, and further makes it possible to prevent the re-aggregation of the filler, so that the method also produces an advantageous effect of making the slurry solution excellent in storage stability.

The present invention also relates to a rubber wet master batch produced by the producing method described in any one of the paragraphs concerned, and a rubber composition comprising this rubber wet master batch. In this rubber wet master batch, both of the carbon black species A and the carbon black species B are satisfactorily dispersed without their structures being broken, the former of these species contributing mainly to an improvement of the vulcanized rubber in low exothermic performance, and the latter contributing mainly to an improvement of the vulcanised rubber in fatigue resistance. For this reason, the vulcanized rubber, which is a vulcanized rubber of the rubber composition comprising this rubber wet master batch, and a pneumatic tire of the rubber composition are improved in low exothermic performance and fatigue resistance with a good balance.

Mode for Carrying out the Invention

The present invention relates to a method for producing a rubber wet master batch obtained by using at least a filler, a dispersing solvent and a rubber latex solution as raw materials.

In the present invention, the filler means an inorganic filler used ordinarily in the rubber industry. Examples thereof include carbon black, silica, clay, talc, calcium carbonate, magnesium carbonate, and aluminum hydroxide. In the invention, the raw materials include, as the filler, the following two carbon black species among these inorganic fillers: a carbon black species A having a nitrogen adsorption specific surface area ($N_2SA$-(A) value) of 130 $m^2/g$ or less; and a carbon black species B having a $N_2SA$-(B) value lower than the $N_2SA$-(A) value by 25 $m^2/g$ or more.

The carbon black species A may be any carbon black species as far as the species has a nitrogen adsorption specific surface area $N_2SA$-(A) value) of 130 $m^2/g$ or less, and the species is usable without any especial restriction.

Examples thereof include N220 ($N_2SA$: 119 $m^2/g$), N234 ($N_2SA$: 126 $m^2/g$), N330 ($N_2SA$: 79 $m^2/g$), N339 ($N_2SA$: 93 $m^2/g$), N550 ($N_2SA$: 42 $m^2/g$), and N774 ($N_2SA$: 27 $m^2/g$) each prescribed in, for example, ASTM D1765. In the meantime, the carbon black species B may be any carbon black species as far as the species shows a $N_2SA$-(B) value higher than the $N_2SA$-(A) value by 25 $m^2/g$ or more. As far as this relationship is satisfied, the carbon black species A and B are selectable form the carbon black species given as the examples.

In order to heighten the resultant vulcanized rubber effectively in low exothermic performance, the blend amount of the carbon black species A is preferably from 7 to 68 parts by mass, more preferably from 12 to 48 parts by mass for 100 parts by mass of the rubber component. In order to heighten the vulcanized rubber in fatigue resistance effectively, the blend amount of the carbon black species B is preferably from 8 to 78 parts by mass, more preferably from 12 to 58 parts by mass for 100 parts by mass of the rubber component.

The carbon black species A and B may each be a granulated product obtained by granulation, considering the handleability thereof in an ordinary rubber industry, or a non-granulated product.

The dispersing solvent is in particular preferably water. The dispersing solvent may be water containing, for example, an organic solvent.

As the rubber latex solution, a natural rubber latex solution and a synthetic rubber latex solution are usable.

The natural rubber latex solution is a natural product produced by a metabolic effect of a plant, and is preferably a natural-rubber/water system solution in which a dispersing solvent is, particularly, water. About the natural latex solution, a concentrated latex, a fresh latex called field latex, and others are usable without being distinguished from each other. The synthetic rubber latex solution is, for example, a solution of styrene-butadiene rubber, butadiene rubber, nitrile rubber or chloroprene rubber produced by emulsion polymerization.

Hereinafter, a description will be made about the method according to the present, invention for producing a rubber wet master batch. This producing method has a step (I) of dispersing the filler into the dispersing solvent to produce a filler-containing slurry solution, a step (II) of mixing the filler-containing slurry solution with the rubber latex solution to produce a filler-containing rubber latex solution, and a step (III) of solidifying and drying the filler-containing rubber latex solution.

The present; invention has the following characteristic: in the case of representing, in the step (I), the period (minute(s)) for dispersing the carbon black species A in the dispersing solvent and that (minute(s)) for dispersing the carbon black species B in the dispersing solvent by $\alpha(A)$ and $\alpha(B)$, respectively, and further representing the rotation number (rpm) of a rotor of a dispersing machine used in the dispersing when the carbon black species A is dispersed, and that (rpm) of a rotor of a dispersing machine used in the dispersing when the carbon black species B is dispersed by $\beta(A)$ and $\beta(B)$, respectively, the following expression is satisfied:

$$1.1\alpha(B) \times \beta(B) \leq \alpha(A) \times \beta(A) \leq 1.5\alpha(B) \times \beta(B) \quad (1)$$

In the present invention, it is possible to select appropriately the respective periods (minute(s)) for dispersing the carbon black species A and B in the dispersing solvent, and the respective rotor rotation numbers (rpm) of the dispersing machines used in the dispersings when the carbon black species A and B are dispersed, respectively, as far as the relationship of $1.1\alpha(B) \times \beta(B) \leq \alpha(A) \times \beta(A) \leq 1.5\alpha(B) \times \beta(B)$ is satisfied.

In the step (I), it is allowable to adjust the carbon black species A and B to satisfy the expression (1), for example, by dispersing the carbon black species A earlier in the dispersing solvent, and adding the carbon black species B to the resultant slurry solution to mix this carbon black species B with the solution. Alternatively, it is allowable to perform the dispersing of the carbon black species A and that of the carbon black species B separately from each other to satisfy the relationship (1), mixing these species with each other in advance after the dispersings, and use the resultant.

In the step (I), the method for mixing the carbon black species A, the carbon black species B, and the dispersing solvent with each other in the presence of the rubber latex solution is, for example, a method of dispersing these carbon black species thereinto by use of a discharging machine such as a High Shear Mixer, a highly shearing mixer, or a homo-mixer. In any case, the method needs to be selected to cause the respective rotor rotation numbers (rpm) of the dispersing machines to satisfy the expression (1).

The "High Shear Mixer" means a mixer having a high-speed-rotatable rotor and a fixed stator in which the rotor is rotated to act a highly shearing effect in the state that a precise clearance is made between the rotor and the stator. In order to produce such a highly shearing effect, it is preferred to set the clearance between the rotor and the stator to 0.8 mm or less, and the circumferential speed of the rotor to 5 m/s or more. Such a High Shear Mixer may be a commercially available product. An example thereof is a mixer, "High Shear Mixer", manufactured by Silverson Nippon Ltd.

In the present invention, it is particularly preferred that the step (I) is a step (I-(a)) in which when the filler is dispersed into the dispersing solvent, at least one portion of the rubber latex solution is added thereto, thereby producing the filler-containing slurry solution that is a slurry solution in which rubber latex particles are bonded to the filler, and further the step (II) is a step II-(a)) in which the rubber -latex-particle-bonded-filler-containing slurry solution is mixed with the rest of the rubber latex solution, thereby producing the filler-containing rubber latex solution that is a rubber latex solution in which the rubber latex particles are bonded to the filler. Hereinafter, the step (I-(a)) and the step (II-(a)) will be described.

(1) Step (I-(a))

In the step (I-(a)), at the time of dispersing a dispersing agent containing carbon black species (1) and a conductive filler (2) into a dispersing solvent, at least one portion of a rubber latex solution is added thereto, thereby producing a slurry solution containing the filler to which rubber latex particles are bonded. It is allowable to mix the rubber latex solution beforehand with the dispersing solvent, and then adding the filler thereto to be dispersed. It is also allowable to add the filler to the dispersing solvent, and next disperse the filler in the dispersing solvent while the rubber latex solution is added thereto at a predetermined speed, or add the filler into the dispersing solvent, and next disperse the filler in the dispersing solvent while the rubber latex solution, which has a predetermined volume, is added thereto by plural operations divided from each other. By the dispersing of the filler into the dispersing solvent in the presence of the rubber latex solution, the slurry solution can be produced, which contains the filler to which rubber latex particles are bonded. The addition amount of the rubber latex solution in the step I-(a)) is, for example, from 0.075 to 12% by mass of the total amount of the used rubber latex solution the whole of the respective amounts added in the step (I-(a)) and the step (II-(a)).

In the step (I-(a)), the proportion of the solid (rubber) in the added rubber latex solution is preferably from 0.25 to 15% by mass, more preferably from 0.5 to 6% by mass of the filler. Moreover, the concentration of the solid (rubber) in the added rubber latex solution is preferably from 0.2 to 5% by mass, more preferably from 0.25 to 1.5% by mass. These cases make it possible to produce a rubber wet master batch in which the filler is heightened in dispersibility while the rubber latex particles are surely bonded to the filler.

In the present invention, at the time of mixing a filler and a dispersing solvent with each other in the presence of a rubber latex solution to produce a slurry solution containing the filler to which rubber latex particles are bonded, a surfactant may be added thereto in order to improve the filler in dispersibility. The surfactant may be a surfactant known in the rubber industry. Examples thereof include nonionic surfactants, anionic surfactants, cationic surfactants, and amphoteric surfactants. Instead of the surfactant, or in addition to the surfactant, an alcohol such as ethanol is also usable. However, it is feared that the use of the surfactant causes a decline in rubber properties of the finally obtained vulcanized rubber. Thus, the blend amount of the surfactant is preferably 2 parts or less by mass, more preferably 1 part or less by mass for 100 parts by mass of the solid (rubber) amount in the rubber latex solution. It is preferred that the surfactant is not substantially used.

About the filler to which the rubber latex particles are bonded in the slurry solution produced in the step (I-(a)), the 90%-volume particle diameter ($\mu m$) ("D90") is preferably 31 $\mu m$ or more, more preferably 35 $\mu m$ or more. In this case, the filler is excellent in dispersibility in the slurry solution, and the re-aggregation of the filler can be prevented. Thus, the slurry solution is excellent in storage stability, and further the finally obtained vulcanized rubber is excellent in exothermic property, durability and rubber strength.

(2) Step (II-(a))

In the step (II-(a)), the slurry solution is mixed with the rest of the rubber latex solution to produce a rubber-latex-particle-bonded-filler-containing rubber latex solution. The method for mixing the slurry solution with the rest of the rubber latex solution in the phase of the liquids is not particularly limited, and may be a method of mixing the slurry solution and the rest of the rubber latex solution with each other, using an ordinary dispersing machine, such as a High Shear Mixer, a highly shearing mixer, a homo-mixer, a ball mill, a bead mill, a high-pressure homogenizer, an ultrasonic homogeniser, or a colloid mill. As required, at the mixing time, the whole of the mixing system of the dispersing machine and others may be heated.

The rest of the rubber latex solution is preferably high in solid (rubber) concentration than the rubber latex solution added in the step (I-(a)), considering the drying period and labor in the step (III). Specifically, the solid (rubber) concentration is preferably from 10 to 60% by mass, more preferably from 20 to 30% by mass.

(3) Step (III)

In the step (III), the filler-containing rubber latex solution is solidified. The method for the solidification may be a method of adding a solidifier to the rubber-latex-partide-bonded-carbon-black-containing rubber latex solution to yield a solidified product.

The solidifier may be one used ordinarily to solidify a rubber latex solution, such as an acid such as formic acid or sulfuric acid, or a salt such as sodium chloride.

In the step (III), the solidified product yielded at the solidifying stage is separated from the solution (solid-liquid separation), and then dried to produce a rubber wet master batch. At the solid-liquid separation stage, it is allowable if necessary to incorporate an aggregating agent into the filler-containing rubber latex solution, and then collect and dry the resultant aggregate. It is allowable to use, as the aggregating agent, a substance known as an aggregating agent for a rubber latex solution without any restriction. A specific example thereof is a cationic aggregating agent. The solid-liquid separation can be attained in a manner known by those skilled in the art, such as centrifugation or filtration.

The method for drying the solidified product may be a method of using a drying machine that may be of various types, such as an oven, a vacuum drier, or an air drier.

After the step (III) is performed, the resultant rubber wet master batch is dry-mixed with various blending agents. Usable examples of the blending agents include a sulfur-containing vulcanizer, a vulcanization promoter, silica, a silane coupling agent, zinc oxide, a methylene receptor and a methylene donor, stearic acid, a vulcanization promoting aid, a vulcanization retardant, an organic peroxide, an anti-ageing agent, softeners such as wax and oil, a processing aid, and any other blending agent used ordinarily in the rubber industry.

It is sufficient for a sulfur species for the sulfur-containing vulcanizer to be a sulfur species for ordinary rubbers. Examples thereof include powdery sulfur, precipitated sulfur, insoluble sulfur, and highly dispersed sulfur. In the rubber composition according to the present invention, the sulfur content is from 0.3 to 6 parts by mass for 100 parts by mass of the rubber component. If the sulfur content is less than 0.3 parts by mass, the vulcanized rubber is insufficient in cross linkage density to be lowered in rubber strength and others. If the sulfur content is more than 6.5 parts by mass, the vulcanized rubber are deteriorated, particularly, in both of heat resistance and durability. In order that the vulcanized rubber can be further improved in heat resistance and durability while ensuring rubber strength satisfactorily, the sulfur content is more preferably from 1.5 to 5.5 parts by mass, even more preferably from 2.0 to 4.5 parts by mass for 100 parts by mass of the rubber component.

The vulcanization promoter may be a vulcanization promoter usable usually for rubber vulcanization, examples thereof including sulfenamide type, thiuram type, thiazole type, thiourea type, guanidine type, and dithiocarbamic acid salt type vulcanization promoters. These may be used singly or in the form of an appropriate mixture. The blend amount of the vulcanization promoter(s) is more preferably from 1.0 to 5.0 parts by mass, even more preferably from 1.5 to 4.0 parts by mass for 100 parts by mass of the rubber component.

The anti-ageing agent may be an anti-ageing agent usable usually for rubbers, examples thereof including aromatic amine type, amine-ketone type, monophenolic type, bisphenolic type, polyphenolic type, dithiocarbantic acid salt type, and thiourea type anti-ageing agents. These may be used singly or in the form of an appropriate mixture. The blend amount of the anti-ageing agent (s) is more preferably from 0.5 to 6.0 parts by mass, even more preferably from 1.0 to 4.5 parts by mass for 100 parts by mass of the rubber component.

When the rubber composition according to the present invention is used for, for example, a tire, a methylene receptor and a methylene donor may be blended into the composition in order to improve the composition in bondability with a belt of the tire. The vulcanized rubber of the rubber composition containing the methylene receptor and the methylene donor can be heightened in bondability with some other member by a hardening reaction between a hydroxyl group of the methylene receptor and a methylene group of the methylene donor.

The methylene receptor may be a phenolic compound, or a phenolic resin obtained by condensing a phenolic compound with formaldehyde. Examples of the phenolic compound include phenol, resorcin, and respective alkyl derivatives of these compounds. Examples of the alkyl derivatives include methyl-group derivatives, such as cresol and xylenol, and derivatives each having a long-chain alkyl group, such as nonylphenyl and octylphenol. The phenolic compound may be a phenolic compound containing, as a substituent, an acyl group such as an acetyl group.

Examples of the phenolic resin, which is obtained by condensing a phenolic compound with formaldehyde, include resorein-formaldehyde resins, phenolic resins phenol-formaldehyde resins), cresol resins (cresol-formaldehyde resins), and formaldehyde resins each made from plural phenolic compounds. These resins are each used in the state of being uncured to be in a liquid form or have thermal fluidity.

Of these examples, resorcin or any resorcin derivative is preferred, and resorcin or resorcin-alkylphenol-formalin resin is particularly preferred as the methylene receptor from the viewpoint of the compatibility of the compound or resin with the rubber component or other components, the reliability thereof, and the denseness of a resin obtained after the compound is cured.

The methylene donor may be hexamethylenetetramine, or a melamine resin. Examples of the melamine resin include methylolmelamine, a partially etherised product of methylolmelamine, and a condensate made from melamine, formaldehyde and methanol. Of these examples, hexamethoxymethylmelamine is particularly preferred.

As described above, in the rubber wet master batch obtained through the step (III), the carbon black species A and B are excellent in dispersibility. For this reason, a pneumatic tire produced using this rubber composition has a rubber region attaining the compatibility of low exothermic performance with fatigue resistance, a specific example of this tire being a pneumatic tire in which the rubber composition according to the present invention is used for a tread rubber, a side rubber, a ply or belt coating rubber, or bead filler rubber.

EXAMPLES

Hereinafter, working examples of this invention will be more specifically described.
Used Materials:
a) Fillers
  Carbon black "N110": "SEAST 9", manufactured by Tokai Carbon Co., Ltd. ($N_2SA$: 142 $m^2/g$)
  Carbon black "N220": "SEAST 6", manufactured by Tokai Carbon Co., Ltd. ($N_2SA$: 119 $m^2/g$)
  Carbon black "N234": "SEAST 7HM", manufactured by Tokai Carbon Co., Ltd. ($N_2SA$: 126 $m^2/g$)
  Carbon black "N330": "SEAST 3", manufactured by Tokai Carbon Co., Ltd. ($N_2SA$: 79 $m^2/g$)
  Carbon black "N339": "SEAST KH", manufactured by Tokai Carbon Co., Ltd. ($N_2SA$: 93 $m^2/g$)
  Carbon black "N550": "SEAST SO", manufactured by Tokai Carbon Co., Ltd. ($N_2SA$: 42 $m^2/g$)
  Carbon black "N774": "SEAST S", manufactured by Tokai Carbon Co., Ltd. ($N_2SA$: 27 $m^2/g$)

b) Dispersing solvent: Wafer
c) Rubber latex solutions:
  Natural rubber latex solution (NR concentrated latex), manufactured by Regitex Co., Ltd. (latex solution obtained by adjusting a latex having a DRC (dry rubber content) of 60% to give a rubber concentration of 25% by mass; mass-average molecular weight Mw=236,000)
  Natural rubber latex solution (NR field latex), manufactured by a company, Golden Hope (latex solution obtained by adjusting a latex having a DRC of 31.2% to give a rubber concentration of 25% by mass; mass-average molecular weight Mw=232,000)
d) Solidifier: Formic acid (solution obtained by diluting a first-class 85% solution thereof into a 10% solution, and adjusted into a pH of 1.2), manufactured by Nacalai Tesque, Inc.;
e) Zinc flower: Zinc flower No. 3, manufactured by Mitsui Mining & Smelting Co., Ltd.
f) Stearic acid, manufactured by NOF Corp.
g) Wax, manufactured by Nippon Seiro Co., Ltd.
h) Anti-ageing agents:
  (A) N-phenyl-N'-(1,3-dimethylbutyl)-p-phenyienediamine "6PPD", manufactured by the company Monsanto; melting point: 44° C.
  (B) 2,2,4-trimethyl-1,2-dihydroquinoline polymer "RD", manufactured by Ouchi Shinko Chemical Industrial Co., Ltd.; melting point: 80 to 100° C.
i) Sulfur:
  Sulfur, manufactured by Tsurumi Chemical Industry Co., Ltd.
j) Vulcanization promoters:
  (A) N-cyclohexyl-2-benzothiazole sulfenamide: "SANCELER CM", manufactured by Sanshin Chemical Industry Co., Ltd.
  (B) 1,3-Diphenylguanidine: "Nocceler D", manufactured by Ouchi Shinko Chemical Industrial Co., Ltd.

Example 1

To one of the diluted latex solutions in water that was adjusted to set the concentration thereof to 0.5% by mass were added 40 parts by mass of the "N220" as a carbon black species A, and then a ROBOMIX manufactured by PRIMIX Corp. was used to disperse the carbon black species therein (ROBOMIX condition ($\beta(A)$)=9000 rpm; and dispersing period (minutes) $\alpha(A)$=35 minutes) to produce a carbon-black-species-A-containing slurry solution in which natural rubber latex particles were bonded to the carbon black species A (step I-(a)). Separately, to one of the diluted latex solutions in wafer that was adjusted to set the concentration thereof to a 0.5% by mass were added 20 parts by mass of the "N550"as a carbon black species B, and then a ROBOMIX manufactured by PRIMIX Corp. was used to disperse the filler therein (ROBOMIX condition ($\beta B$))=9000 rpm; and dispersing period (minutes) $\alpha(B)$=30 minutes) to produce a carbon-black-species-B-containing slurry solution in which natural rubber latex particles were bonded to the carbon black species B (step (I-(a)).

Next, the carbon-black-species-A-containing slurry solution and the carbon-black-species-B-containing slurry solution each produced in the step (I-(a)), and the rest of the natural rubber latex solution (solution adjusted into a solid (rubber) concentration of 25% by mass by the addition of water) were used together, and these slurry solutions were added to the latex solution to set the solid (rubber) amount to 100 parts by mass. Next, a mixer, for household use, manufactured by Sanyo Electric Co., Ltd. (mixer condition:

11300 rpm) was used (for 30 minutes) to produce a natural rubber latex solution containing the carbon black species A/B to which natural rubber latex particles were bonded (step II-(a)).

To the natural rubber latex solution produced through the step II-(a)), which contained the carbon black species A/B to which the natural rubber latex particles were bonded, was added a 10%-by-mass solution of formic acid in water as a solidifier until the pH of the latex solution turned to 4. In the state that the latex solution was heated to 90° C., the natural rubber latex solution, which contained the carbon black species A/B to which the natural rubber latex particles were bonded, was solidified (step (III)).

A punching metal 2.0φ and 3.5P made of stainless steel was used to separation-filtrate the latex solution to separate the solidified product from the solution. A squeezer-type monoaxial extrusion-dehydrating machine(V-02 model) manufactured by Suehiro EPM Corp. was used to dry the solidified product. In this way, a natural rubber wet master batch was produced (step (III)).

A B-type Bunbury mixer manufactured by Kobe Steel, Ltd.) was used to blend various additives described in Table 1 into the resultant natural rubber wet master batch to prepare a rubber composition. Physical properties of a vulcanized rubber of the rubber composition were measured. The results are shown, in Table 1.

Example 2, and Comparative Examples 2 to 4, 6 and 8

In each of the examples, a rubber wet master batch was produced under the same conditions except that the respective types of the carbon black species A and B, the respective dispersing periods (minutes) α(A) and α(B) of the carbon black species A and B, and the respective rotor rotation numbers (rpm) β(A) and β(B) of the dispersing machines used when these species were dispersed were partially or wholly changed to ones described in Table 1 or 2.

Examples 3 to 9

In each of the examples, the respective types of the carbon black species A and B, the respective dispersing periods (minutes) α(A) and α(B) of the carbon black species A and B, and the respective rotor rotation numbers (rpm) β(A) and β(B) of the dispersing machines used when these species were dispersed were partially or wholly changed to ones described in Table 1 or 2. Furthermore, a mixer, for household use, manufactured by Sanyo Electric Co., Ltd. was used to mix the carbon-black-species-A-containing slurry solution in advance with the carbon-black-species-B-containing slurry solution (mixer condition: 11300 rpm; and in-advance-mixing period: 5 minutes). Thereafter, in the step (II), the mixture was mixed with the same rubber latex solution to produce a carbon-black-species-A/B-containing rubber latex solution. Under the same conditions as used in Example 1 except the operations described hereinbefore, a rubber wet master batch was produced.

Comparative Examples 1, 5, 7 and 9

In each of the examples, various blending agents described in Table 1 or 2 were dry-mixed with each other instead of using any process of producing a rubber master batch and then using this master batch as a raw material to produce a rubber composition. In this way, a rubber composition was produced. The results are shown in Table 1 or 2.

Evaluations:

Evaluations were made about a rubber obtained by using a predetermined mold to heat each of the rubber compositions at 150° C. for 30 minutes to be vulcanized.

Low Exothermic Performance:

In accordance with JIS K6265, the low exothermic performance of each of the produced vulcanized rubbers was evaluated on the basis of the loss tangent tanδ thereof. A rheospectrometer E4 000 manufactured by a company, UBM was used to measure the rubber at 50 Hz and 80 ° C. under a condition of a dynamic strain of 2%. In the evaluation, the value of Comparative Example 1 was regarded as 100, and Examples 1 to 5 and Comparative Examples 2 to 8 were each evaluated on the basis of an index relative thereto; and further the value of Comparative Example 9 was regarded as 100, and Examples 6 to 9 were each evaluated on the basis of an index relative thereto. It is denoted that as the numerical value is lower, the low exothermic performance is better. The results are shown in Tables 1 and 2.

Fatigue Resistance:

In accordance with JIS K6260, the fatigue resistance of each of the produced vulcanized rubbers was evaluated. In the evaluation, the value of Comparative Example 1 was regarded as 100, and Examples 1 to 5 and Comparative Examples 2 to 8 were each evaluated on the basis of an index relative thereto; and further the value of Comparative Example 9 was regarded as 100, and Examples 6 to 9 were each evaluated on the basis of an index relative thereto. It is denoted that as the numerical value is higher, the fatigue resistance is better. The results are shown in Tables 1 and 2.

TABLE 1-1

| | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|
| Carbon black species A dispersing conditions | Rotor rotation number [rpm] β(A) of dispersing machine | — | 9000 | 9000 | 10500 | — | 9000 | — |
| | Dispersing period [minutes] α(A) | — | 30 | 35 | 40 | — | 35 | — |
| | (α(A) × β(A)) ÷ 1000 | — | 270 | 315 | 420 | — | 315 | — |
| Carbon black species B dispersing conditions | Rotor rotation number [rpm] β(B) of dispersing machine | — | 9000 | 9000 | 9000 | — | 9000 | — |
| | Dispersing period [minutes] α(B) | — | 30 | 35 | 30 | — | 30 | — |
| | (α(B) × β(B)) ÷ 1000 | — | 270 | 315 | 270 | — | 270 | — |
| | (α(A) × β(A))/(α(B) × β(B)) | — | 1.0 | 1.0 | 1.6 | — | 1.2 | — |
| | ($N_2SA$ − (A)) − ($N_2SA$ − (B)) | 77 | 77 | 77 | 77 | 7 | 7 | 100 |

TABLE 1-1-continued

| | | | | | | | |
|---|---|---|---|---|---|---|---|
| Mixing of carbon-black-species-A-containing slurry solution in advance with carbon-black-species-B-containing slurry solution | — | Not performed | Not performed | Not performed | — | Not performed | — |

| | | | Comparative Example 8 | Example 1 | Example 2 | Example 3 | Example 4 | Example 5 |
|---|---|---|---|---|---|---|---|---|
| Carbon black species A dispersing conditions | Rotor rotation number [rpm] β(A) of dispersing machine | | 9000 | 9000 | 10500 | 9000 | 9000 | 9000 |
| | Dispersing period [minutes] α(A) | | 35 | 35 | 30 | 25 | 40 | 40 |
| | (α(A) × β(A)) + 1000 | | 315 | 315 | 315 | 315 | 360 | 360 |
| Carbon black species B dispersing conditions | Rotor rotation number [rpm] β(B) of dispersing machine | | 9000 | 9000 | 9000 | 9000 | 9000 | 9000 |
| | Dispersing period [minutes] α(B) | | 30 | 30 | 30 | 30 | 30 | 30 |
| | (α(B) × β(B)) + 1000 | | 270 | 270 | 270 | 270 | 270 | 270 |
| (α(A) × β(A))/(α(B) × β(B)) | | | 1.2 | 1.2 | 1.2 | 1.2 | 1.3 | 1.3 |
| (N₂SA − (A)) − (N₂SA − (B)) | | | 100 | 77 | 77 | 77 | 77 | 92 |
| Mixing of carbon-black-species-A-containing slurry solution in advance with carbon-black-species-B-containing slurry solution | | | Not performed | Not performed | Not performed | Performed | Performed | Performed |

TABLE 1-2

| | | | | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|
| Blending components in rubber composition | Blending components in rubber wet master batch | Carbon black species A | N110 | — | — | — | — | — | — | — |
| | | | N220 | — | 40 | 40 | 40 | — | 40 | — |
| | | Carbon black species B | N234 | — | — | — | — | — | 20 | — |
| | | | N550 | — | 20 | 20 | 20 | — | — | — |
| | | | N774 | — | — | — | — | — | — | — |
| | | Natural rubber (solid) | | — | 100 | 100 | 100 | — | 100 | — |
| | Natural rubber | | | 100 | — | — | — | 100 | — | 100 |
| | Carbon black species | | N110 | — | — | — | — | — | — | 40 |
| | | | N220 | 40 | — | — | — | 40 | — | — |
| | | | N234 | — | — | — | — | 20 | — | — |
| | | | N550 | 20 | — | — | — | — | — | 20 |
| | Zin flower | | | 3 | 3 | 3 | 3 | 3 | 3 | 3 |
| | Stearic acid | | | 2 | 2 | 2 | 2 | 2 | 2 | 2 |
| | Wax | | | 2 | 2 | 2 | 2 | 2 | 2 | 2 |
| | Anti-ageing agents | (A) | | 2 | 2 | 2 | 2 | 2 | 2 | 2 |
| | | (B) | | 1 | 1 | 1 | 1 | 1 | 1 | 1 |
| | Sulfur | | | 2 | 2 | 2 | 2 | 2 | 2 | 2 |
| | Vulcanization promoters | (A) | | 1.5 | 15 | 1.5 | 1.5 | 1.5 | 1.5 | 1.5 |
| | | (B) | | 0.5 | 0.5 | 0.5 | 0.5 | 0.5 | 0.5 | 0.5 |
| Vulcanized rubber properties | Low exothermic performance (tanδ) | | | 100 | 97 | 95 | 94 | 108 | 106 | 131 |
| | Fatigue resistance | | | 100 | 115 | 111 | 103 | 112 | 115 | 151 |

| | | | | Comparative Example 8 | Example 1 | Example 2 | Example 3 | Example 4 | Example 5 |
|---|---|---|---|---|---|---|---|---|---|
| Blending components in rubber composition | Blending components in rubber wet master batch | Carbon black species A | N110 | 40 | — | — | — | — | — |
| | | | N220 | — | 40 | 40 | 40 | 40 | 40 |
| | | Carbon black species B | N234 | — | — | — | — | — | — |
| | | | N550 | 20 | 20 | 20 | 20 | 20 | — |
| | | | N774 | — | — | — | — | — | 20 |
| | | Natural rubber (solid) | | 100 | 100 | 100 | 100 | 100 | 100 |
| | Natural rubber | | | — | — | — | — | — | — |
| | Carbon black species | | N110 | — | — | — | — | — | — |
| | | | N220 | — | — | — | — | — | — |
| | | | N234 | — | — | — | — | — | — |
| | | | N550 | — | — | — | — | — | — |
| | Zin flower | | | 3 | 3 | 3 | 3 | 3 | 3 |
| | Stearic acid | | | 2 | 2 | 2 | 2 | 2 | 2 |
| | Wax | | | 2 | 2 | 2 | 2 | 2 | 2 |

TABLE 1-2-continued

|  |  |  |  |  |  |  |  |
|---|---|---|---|---|---|---|---|
| Anti-ageing agents | (A) | 2 | 2 | 2 | 2 | 2 | 2 |
|  | (B) | 1 | 1 | 1 | 1 | 1 | 1 |
| Sulfur |  | 2 | 2 | 2 | 2 | 2 | 2 |
| Vulcanization promoters | (A) | 1.5 | 1.5 | 1.5 | 1.5 | 1.5 | 1.5 |
|  | (B) | 0.5 | 0.5 | 0.5 | 0.5 | 0.5 | 0.5 |
| Vulcanized rubber properties | Low exothermic performance (tanδ) | 127 | 89 | 86 | 84 | 81 | 77 |
|  | Fatigue resistance | 156 | 127 | 129 | 125 | 121 | 133 |

TABLE 2

|  |  |  | Comparative Example 9 | Example 6 | Example 7 | Example 8 | Example 9 |
|---|---|---|---|---|---|---|---|
| Carbon black species A dispersing conditions | Rotor rotation number [rpm] β(A) of dispersing machine | | — | 9000 | 9000 | 9000 | 9000 |
|  | Dispersing period [minutes] α(A) | | — | 40 | 40 | 40 | 40 |
|  | (α(A) × β(A)) + 1000 | | — | 360 | 360 | 360 | 360 |
| Carbon black species B dispersing conditions | Rotor rotation number [rpm] β(B) of dispersing machine | | — | 9000 | 9000 | 9000 | 9000 |
|  | Dispersing period [minutes] α(B) | | — | 30 | 30 | 30 | 30 |
|  | (α(B) × β(B)) + 1000 | | — | 270 | 270 | 270 | 270 |
| (α(A) × β(A))/(α(B) × β(B)) | | | — | 1.3 | 1.3 | 1.3 | 1.3 |
| (N$_2$SA − (A)) − (N$_2$SA − (B)) | | | 37 | 37 | 52 | 51 | 66 |
| Mixing of carbon-black-species-A-containing slurry solution in advance with carbon-black-species-B-containing slurry solution | | | — | Performed | Performed | Performed | Performed |
| Blending components in rubber composition | Blending components in rubber wet master batch | Carbon black species A | N330 | — | 40 | 40 | — | — |
|  |  |  | N339 | — | — | — | 40 | 40 |
|  |  | Carbon black species B | N550 | — | 20 | — | 20 | — |
|  |  |  | N774 | — | — | 20 | — | 20 |
|  |  | Natural rubber (solid) |  | — | 100 | 100 | 100 | 100 |
|  | Natural rubber |  |  | 100 | — | — | — | — |
|  | Carbon black species | | N330 | 40 | — | — | — | — |
|  |  |  | N550 | 20 | — | — | — | 40 |
|  | Zin flower |  |  | 3 | 3 | 3 | 3 | 3 |
|  | Stearic acid |  |  | 2 | 2 | 2 | 2 | 2 |
|  | Wax |  |  | 2 | 2 | 2 | 2 | 2 |
|  | Anti-ageing agents |  | (A) | 2 | 2 | 2 | 2 | 2 |
|  |  |  | (B) | 1 | 1 | 1 | 1 | 1 |
|  | Sulfur |  |  | 2 | 2 | 2 | 2 | 2 |
|  | Vulcanization promoters |  | (A) | 1.5 | 1.5 | 1.5 | 1.5 | 1.5 |
|  |  |  | (B) | 0.5 | 0.5 | 0.5 | 0.5 | 0.5 |
| Vulcanized rubber properties | Low exothermic performance (tanδ) | | 100 | 86 | 79 | 88 | 83 |
|  | Fatigue resistance | | 100 | 131 | 126 | 137 | 133 |

It is understood from the results in Tables 1 and 2 that the vulcanized rubber of the rubber composition containing the rubber wet master batch obtained by the producing method according to each of Examples 1 to 9 was excellent in low exothermic performance and fatigue resistance. In the meantime, although in Comparative Example 2 the carbon black species A and the carbon black species B were dispersed under the same conditions, the carbon black species A was insufficient in dispersibility so that the vulcanized rubber was improved in neither low exothermic performance nor fatigue resistance. In Comparative Example 3, the carbon black species A and the carbon black species B were dispersed under the same conditions; however, the dispersing period was made longer than in Comparative Example 2. As a result, a fracture of the structure of the carbon black species B advanced so that the vulcanized rubber was deteriorated in fatigue resistance. In Comparative Example 4, the conditions for dispersing the carbon black species A were too intense. As a result, a fracture of the structure of the carbon black species A advanced so that the vulcanized rubber was deteriorated in fatigue resistance. In Comparative Example 6, the difference in N$_2$SA between the carbon black species A and B was less than 25 so that neither the low exothermic performance nor the fatigue resistance of the vulcanized rubber was improved. In Comparative Example 8, the N$_2$SA of the carbon black species A was more than 130 m$^2$/g so that the vulcanized rubber was largely deteriorated in low exothermic performance.

The invention claimed is:

1. A method for producing a rubber wet master batch obtained by using at least a filler, a dispersing solvent and a rubber latex solution as raw materials, the method comprising a step (I) of dispersing the filler into the dispersing solvent to produce a filler-containing slurry solution, a step (II) of mixing the filler-containing slurry solution with the rubber latex solution to produce a filler-containing rubber latex solution, and a step (III) of solidifying and drying the filler-containing rubber latex solution, wherein the filler comprises two filler species that are a carbon black species A showing a nitrogen adsorption specific surface area (N$_2$SA-(A) value) of 130 m$^2$/g or less, and a carbon black species B showing an N$_2$SA-(B) value lower than the N$_2$SA-(A) value by 25 m$^2$/g or more; and in the case of representing, in the step (I), following expression is satisfied:

$$1.1\alpha(B)\times\beta(B)\leq\alpha(A)\leq 1.5\alpha(B)\times\beta(B)$$

wherein α(A) is the period (minute(s)) for dispersing the carbon black species A in the dispersing solvent, α(B) is the period (minute(s)) for dispersing the carbon black species B in the dispersing solvent, β(A) represented the rotation number (rpm) of a rotor of a dispersing machine used in the dispersing when the carbon black species A is dispersed, and β(B) represented the (rpm) of a rotor of a dispersing machine used in the dispersing when the carbon black species B is dispersed.

2. The method for producing a rubber wet master batch according to claim 1, wherein in the step (I), the dispersing of the carbon black species A and that of the carbon black species B are performed separately from each other to satisfy the expression, and after the dispersings, the resultants are mixed with each other in advance.

3. The method for producing a rubber wet master batch according to claim 1, wherein the step (I) is a step (I-(a)) in which when the filler is dispersed into the dispersing solvent, at least one portion of the rubber latex solution is added thereto, thereby producing the filler-containing slurry solution that is a slurry solution in which rubber latex particles are bonded to the filler, and the step (II) is a step (II-(a)) in which the rubber-latex-particle-bonded-filler-containing slurry solution is mixed with the rest of the rubber latex solution, thereby producing the filler-containing rubber latex solution that is a rubber latex solution in which the rubber latex particles are bonded to the filler.

4. A rubber wet master batch, produced by the producing method recited in claim 1.

5. A rubber composition, comprising the rubber wet master batch recited in claim 4.

6. A pneumatic tire, comprising the rubber composition recited in claim 5.

* * * * *